Dec. 28, 1926.
W. P. CAINE
GREASE CUP
Filed Dec. 6, 1924
1,611,996
2 Sheets-Sheet 1
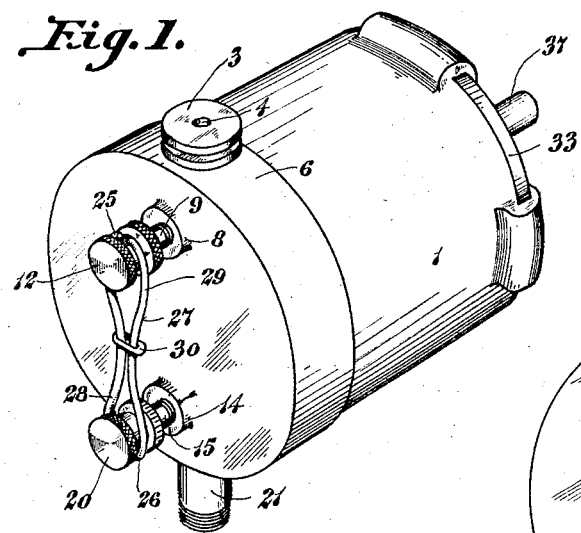
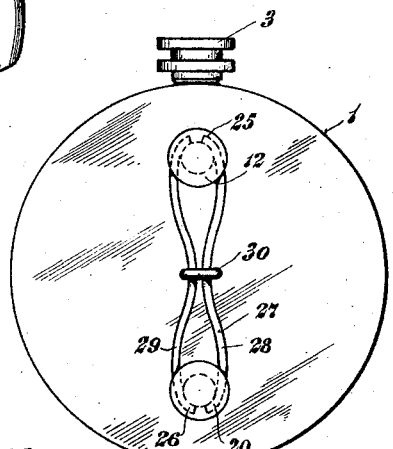
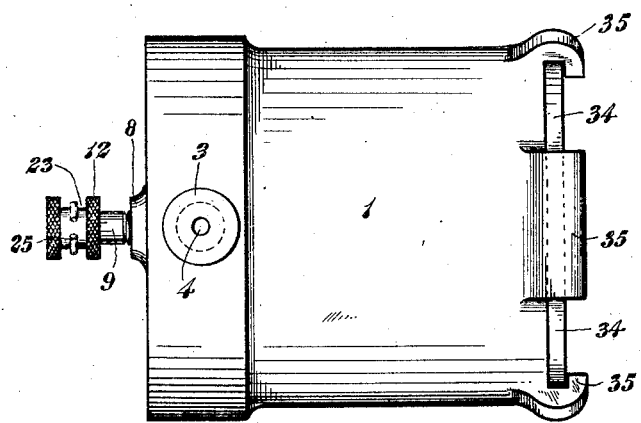
INVENTOR
William P. Caine
ATTORNEY Dec. 28, 1926.
W. P. CAINE
GREASE CUP
Filed Dec. 6, 1924
1,611,996
2 Sheets-Sheet 2
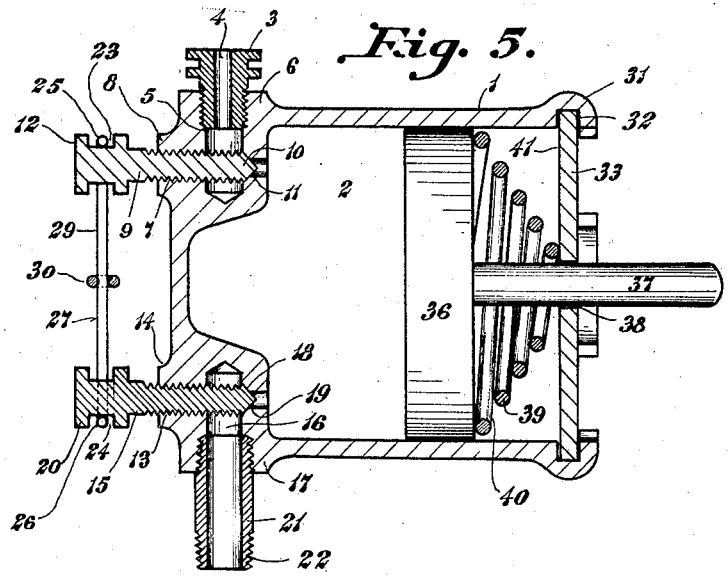
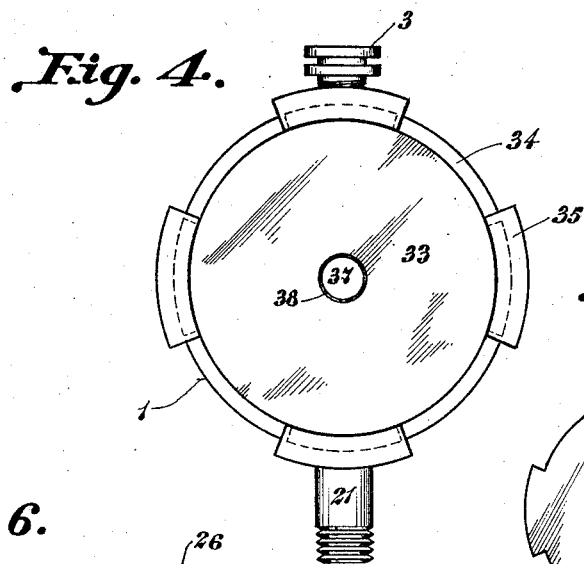
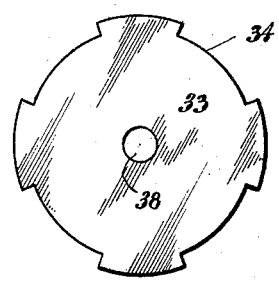
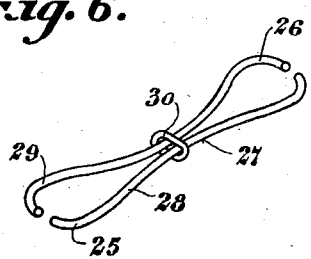
INVENTOR
William P. Caine
BY James N. Ramsey
ATTORNEY Patented Dec. 28, 1926.

1,611,996

UNITED STATES PATENT OFFICE.

WILLIAM P. CAINE, OF ENSLEY, ALABAMA.

GREASE CUP.

Application filed December 6, 1924. Serial No. 754,320.

My invention relates to grease cups adapted to be filled by force feed mechanism and having manually operative means whereby the flow of grease from the cup is regulated.

Heretofore, it has been customary to utilize various means for filling grease cups by force feed, among which is the usual grease gun adapted to be connected to the usual cup in a manner entirely dependent upon the type of machinery upon which the cups are installed. However, the usual style of grease cups having an extended nipple at its bottom for connection with machinery together with other necessary structure for providing convenient means for the attachment of a grease gun to the cup, renders the device top-heavy and otherwise unsatisfactory for the reason that excessive vibration, characteristic of high speed mechanism, breaks the nipple leading from the cup to the part being lubricated. Furthermore, the usual inlet and outlet valves are inaccessible when used on certain types of machinery.

The objects of my invention are to provide simple, efficient, economical and practical means whereby a grease cup can be refilled with lubricating material without removing the cap and without disconnecting or disengaging any of the parts from the device; to provide manually operative and adjustable means whereby the quantity of grease discharged over a given period of time from the cup is adapted to be controlled; to provide means for locking the valves in the desired position irrespective of the vibration of the machinery upon which my invention is installed; and to provide a compact device having convenient and accessible means for connecting and disconnecting a grease gun.

My invention consists in providing a body casting which mainly comprises the grease cup having a pair of spaced apart and parallel holes leading through one end thereof and into said grease chamber of said cup; in providing a pair of valves threaded in said holes, respectively, and the outer ends of said valves each having a circular groove therein adapted to receive a spring member for the purpose of preventing movement of said valves in said holes respectively, irrespective of the vibration of the machinery upon which the cup is installed; in providing an inlet and an outlet, respectively, leading into said cup, said inlet having a filler fitting or nipple threaded therein for the purpose of receiving the end of a grease gun and said outlet having a nipple threaded therein for connecting said grease cup to the part of the machinery to be lubricated; in providing a circular disc having spaced apart notches in its periphery adapted to register with projections or lugs integral with the other end of said cup having an inner circumferential groove therein, adjacent said lugs, for the purpose of detachably securing said disc to said cup whereby the plunger within said cup is maintained in forced tension engagement with the grease therein, as by a coil spring combinedly engaging the adjacent surfaces of said plunger and disc, respectively.

My invention also consists in the construction, combination, arrangement and location of parts as herein set forth and claimed.

In the drawings:

Fig. 1 is a perspective view of my invention;

Fig. 2 is an end elevation of the same;

Fig. 3 is a plan view of the same;

Fig. 4 is an end elevation of the same showing the opposite end from that as shown in Fig. 2;

Fig. 5 is a vertical section of my invention;

Fig. 6 is a perspective of the spring retaining member; and

Fig. 7 is a plan view of the cup closure disc.

In the preferred construction of my invention I provide a cup or body 1 having chamber 2 therein for receiving grease forced from a usual grease gun (not shown) which is adapted to have its end detachably received by nipple or filler fitting 3 having hole 4 therethrough. The nipple has threaded connection in inlet 5 leading through boss 6 into and at right angle with hole 7 leading from the outside of the cup through boss 8 and into chamber 2. Valve stem 9, threaded into hole 7, is adapted to extend beyond the lower end of inlet 5 and has end 10 adapted to seat in valve seat 11 formed in boss 8 for the purpose of closing the opening leading from inlet 5 into chamber 2, as by manual rotation of knob 12 integral with the outer end of the stem.

Hole 13 extending in spaced apart and parallel relation with hole 7 leads from the outside of the cup through boss 14 and into chamber 2. Hole 13 has threaded valve-stem 15 received therein and adapted to extend beyond outlet 16 leading through boss 17 from the outside of the cup into and at right angles with hole 13. End 18 of valve-stem 15 is adapted to seat in valve seat 19 formed in boss 14 and is adjustable therefrom by manual operation of knob 20 integral with the outer end of valve stem 15, whereby the quantity of grease over a given period of time discharged from chamber 2 of the cup, (through hole 13, into outlet 16, through shank 21 threaded in outlet 16 and having its outer end 22 connected with the parts of the machinery being lubricated) is adapted to be controlled.

Knobs 12 and 20, of stems 9 and 15, respectively, have circular grooves 23 and 24 therein for receiving ends 25 and 26, respectively, of spring member 27, (shown in Fig. 6) for the purpose of maintaining the stems in adjusted position irrespective of the vibration of the machinery upon which the cup is attached. The spring member 27 comprises spring bars 28 and 29 each having their outer ends curved outwardly and their intermediate portions curved inwardly and connected together at their central portions by clamp 30 combinedly received therearound. The contact or frictional engagement of ends 25 and 26, respectively, with knobs 12 and 20 need be only sufficient to maintain the knobs against rotary movement caused by vibration of the machinery. If desired the inner and engaging portions of ends 25 and 26 of the spring member may be roughened as by a knurled surface adapted to engage a similar surface of the knobs.

End 31 of cup 1 is provided with inner circumferential groove 32 for the purpose of receiving disc 33 having spaced apart notches 34 in its outer periphery adapted to register with spaced apart projections 35 in end 31 of the cup, whereby the disc is adapted to be detachably maintained in the position as shown in Fig. 5, for closing chamber 2 of the grease cup. When it is desired to remove disc 33 from the grease cup it is merely necessary to manually exert inward pressure on the disc and then rotate it until notches 34 in the disc register with projections 35 in the cup when the disc may be readily removed therefrom. Plunger 36 is adapted to fit in chamber 2 of the cup and has centrally disposed integral plunger 37 extending outwardly through hole 38 in disc 33 for the purpose of providing an ocular gage for readily and conveniently indicating the quantity of grease within the cup. Coil spring 39 in chamber 2 is in compressional engagement with side 40 of plunger 36 and side 41 of disc 33, whereby continuous pressure is adapted to be exerted by plunger 36 on the grease within the cup, thereby assuring a continuous flow of grease from the cup through hole 13, outlet 16 and nipple 21, and thence to the part being lubricated.

The mechanical operation of my invention is as follows:

Assume grease cup 1 is empty and that it is properly installed on the machinery.

The end of a grease gun is connected to nipple 3 having threaded connection with boss 6 and in inlet 5. Knob 12 is then manually rotated until end 10 of valve stem 9 is in disengagement with seat 11 whereby the opening leading from inlet 5 through hole 7 into chamber 2 of the cup is opened. Grease is forced, by usual mechanism, from the gun through hole 4, in nipple 3, into inlet 5 and through hole 7 into chamber 2, thereby forcing plunger 36 outwardly and compressing coil spring 39. When the cup is filled with grease, knob 12 of valve-stem 9 is manually rotated until end 10 of the stem is in seating engagement with valve seat 11 formed in boss 8, whereby the opening leading from nipple 3 into chamber 2 of the cup is closed. The end of the grease gun is then disconnected from the nipple. When it is desired to completely close the flow of grease from chamber 2 of the cup through nipple 21 to the part being lubricated, knob 20 is manually rotated until end 18 of stem 15 is in seating engagement with valve seat 19, formed in boss 14, whereby the opening leading from chamber 2 of the cup into outlet 16 is closed. By manual operation of knob 20 end 18 of valve-stem 15 may be positioned relative to seat 19 so that a desired rate of flow of grease from the cup to the part being lubricated is accomplished.

It is apparent that I have invented a simple, efficient and practical device for the purposes intended and which may be manufactured at a relatively low cost, for the reason that the cup may be cast from suitable material after which holes 5, 7, 13 and 16 may be drilled and threaded and nipple 3, stems 9 and 15 and nipple 21 may be threaded for the assembly of the completed structure. Disc 33 also may be manufactured at a comparatively low cost as by a punching or casting process.

An advantage of my invention is that the construction, location and arrangement of the parts render the device easily accessible for connecting and disconnecting a grease gun when my device is installed on machinery. Furthermore, my invention comprises a compact structure particularly adapted for its intended uses on machinery and for attaching a grease gun which must necessarily be accomplished under conditions of small working space in which to make the proper connections.

In arranging cup 1 in a horizontal position and in positioning horizontal holes 7 and 13, as shown and described, I have considerably lessened the usual height of a grease cup, as measured from the machinery upon which it is installed, thereby lowering the center of gravity and producing a structure particularly adapted to be unaffected by excessive vibration of the machinery in which it is incorporated.

The means which I have employed for adjustably accomplishing a control of the feed of grease, over a given period of time, from the grease cup to the part being lubricated is an extremely simple, practical and highly desirable construction, as well as permitting the use of my invention on various types of machinery where advantageous and efficient results and economical use of grease is desirable and required.

While I have chosen to illustrate the form of construction of my invention by the herein drawings and explanations of the same, I desire to emphasize the fact that the form and the explanation as relates thereto, are not intended to include the various forms of modification, in which my invention may be incorporated. It is understood that my invention resides in the combination, and arrangement of parts and the details of construction, as hereinafter claimed, and that changes in the precise embodiment of the invention as herein disclosed can be made within the scope of what is claimed without departing from the spirit of the invention.

What I claim as new and desire to secure by Letters Patent is:

1. A grease cup comprising a body having a chamber therein and having an inlet and an outlet, said inlet having a valve seat therein, said body having a threaded hole in alinement with said seat, said outlet having a valve seat therein and said body having a threaded hole in alinement with the second mentioned valve seat, a valve stem threaded into each of said holes, respectively, and having an end adapted to engage its valve seat, an inlet nipple threaded into said inlet and having its outer end adapted to receive a grease gun, an outlet nipple threaded into said outlet and adapted to be connected to a part of machinery to be lubricated, a knob on the outer end of each of said valve stems and each knob having a circumferential groove therein, and a spring member adapted to engage said knobs within said grooves, respectively, whereby said valves are maintained in adjusted position irrespective of the vibration of the machinery upon which said grease cup is installed.

2. A grease cup comprising a body having a grease chamber therein and having one end provided with an inlet and an outlet, a plunger in said cup, a stem on said plunger and projecting through the other end of said cup, a spring interposed between said plunger and last mentioned end, a valve seat in said inlet and outlet, respectively, a threaded hole in alinement with each valve seat, a valve threaded into each threaded hole, and means attached to said valves to hold them in adjusted position.

3. A grease cup comprising a body having a grease chamber therein and having one end provided with an inlet and an outlet, a plunger in said cup, means to actuate said plunger, a valve seat in said inlet and outlet, respectively, a threaded hole in alinement with each valve seat, a threaded valve mounted in each of said holes, and each valve having a knob provided with a groove therein, and a spring member having engaging ends adapted to embrace said knobs, respectively, in said grooves whereby said valves may be held in any adjusted position desired.

4. A grease cup comprising a body having a grease chamber provided with an inlet and an outlet, a valve adapted to control the inlet, a valve adapted to control the outlet, a spring member comprising two bars centrally curved toward each other and curved away from each other at their ends, and a ring clamp slidably mounted on said bars intermediate their ends whereby the curved ends of said bars will embrace said knobs in their grooves, respectively, and thereby hold the valves against accidentally shifting.

5. A grease cup comprising a body having a chamber provided with an inlet and an outlet, a valve adapted to control said inlet, a valve adapted to control said outlet, each of said valves having a head provided with a groove having a roughened surface and a spring clamp adapted to embrace said valves on said roughened surface whereby said valves are held from movement relative to each other.

6. In a grease cup, a body having a grease retaining chamber therein and having inwardly projecting lugs fixed to one end thereof, a disc having notches in its periphery adapted to register with said lugs and lugs on said disc between said notches whereby said disc is adapted to be maintained in position in said body, a pair of spaced apart valve stems mounted in said body and adapted to control the flow of grease to and from said chamber, a knob on the outer ends of each valve and each of said knobs having a circumferential groove therein, a spring member adapted to engage said knobs in said grooves for the purpose of maintaining said valves against rotary movement caused by vibration of the machinery upon which said cup is installed, and said body having an outlet leading from said recess to the outside of said cup and means for connecting said outlet with a part to be lubricated.

WILLIAM P. CAINE.